Feb. 3, 1970    L. GYUGYI ET AL    3,493,838
STATIC FREQUENCY CONVERTER WITH NOVEL VOLTAGE CONTROL
Filed April 21, 1967    7 Sheets-Sheet 1

INVENTORS
Brian R. Pelly and
Laszlo Gyugyi.
BY
ATTORNEY

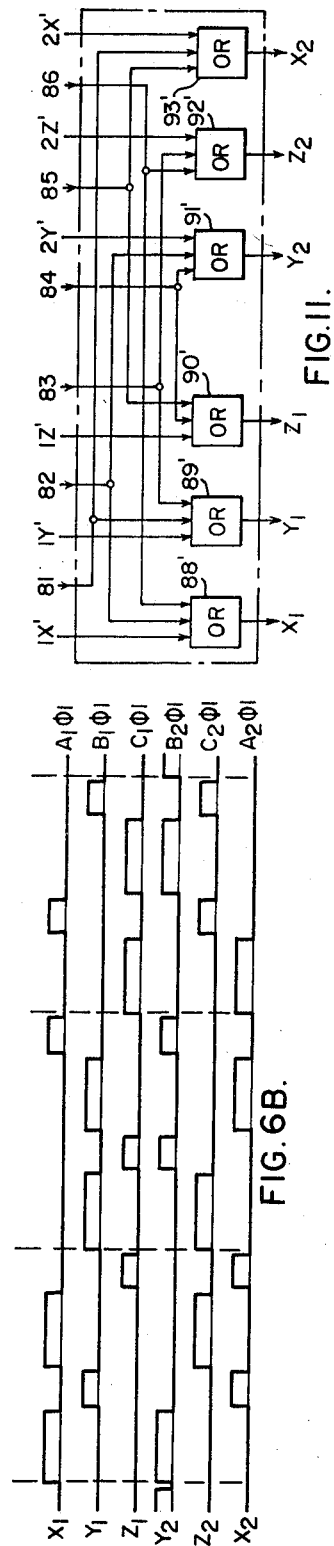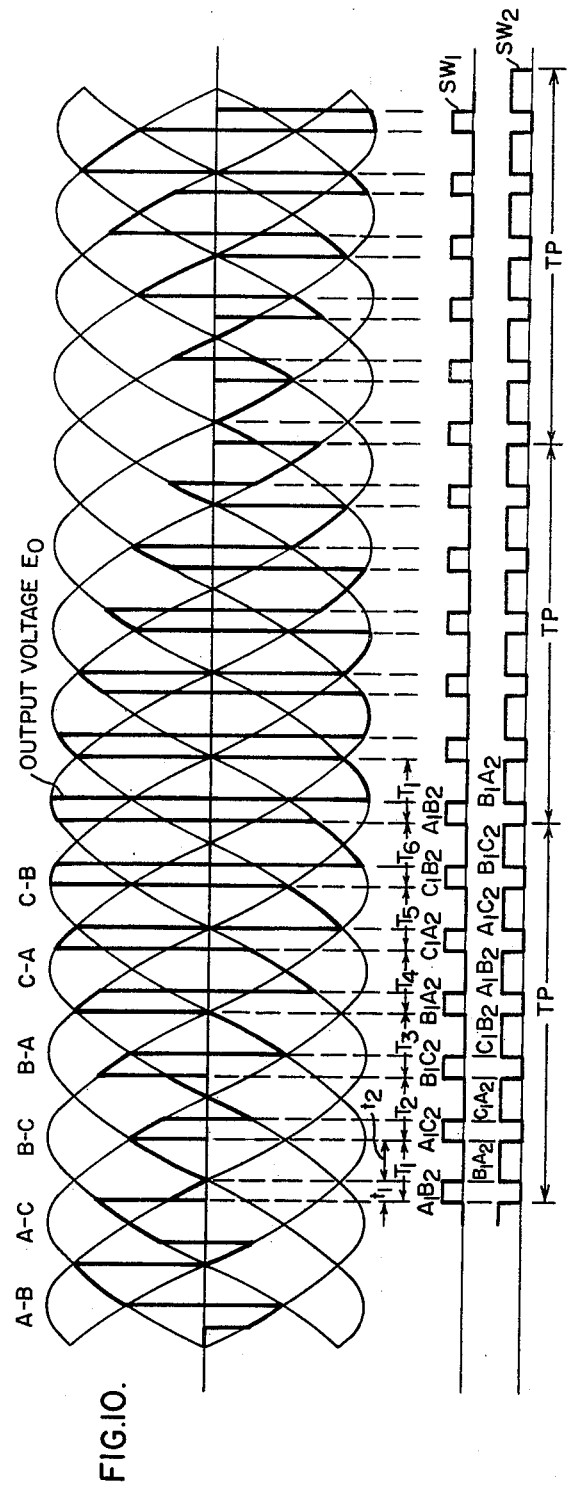

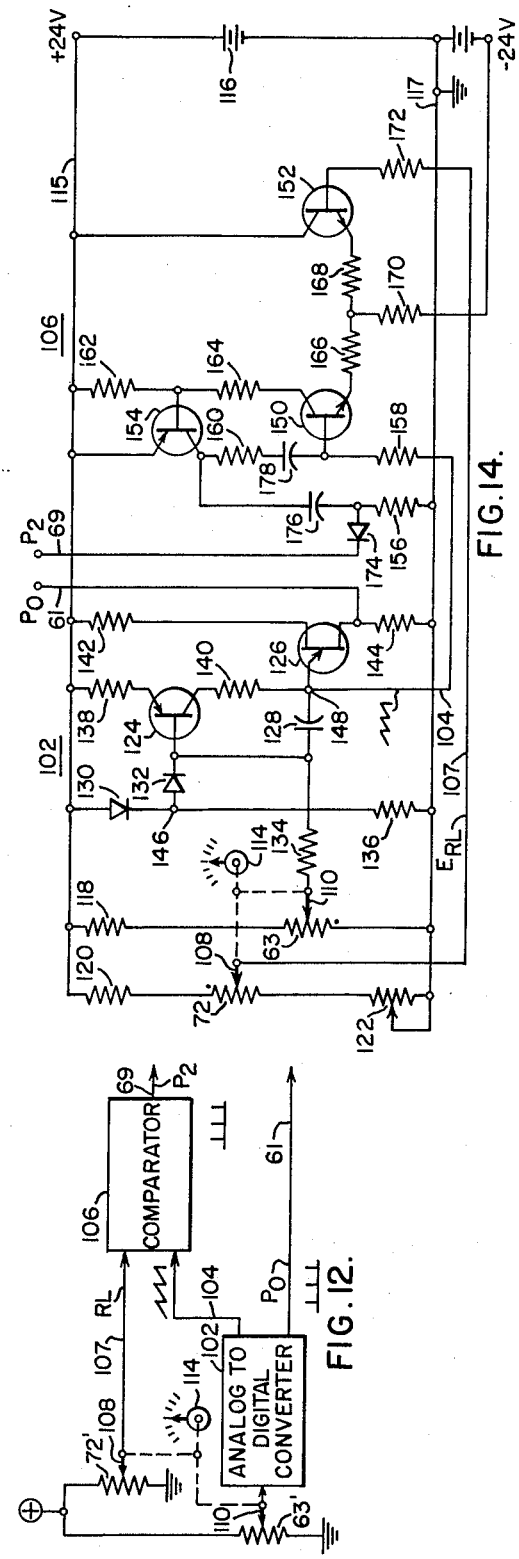
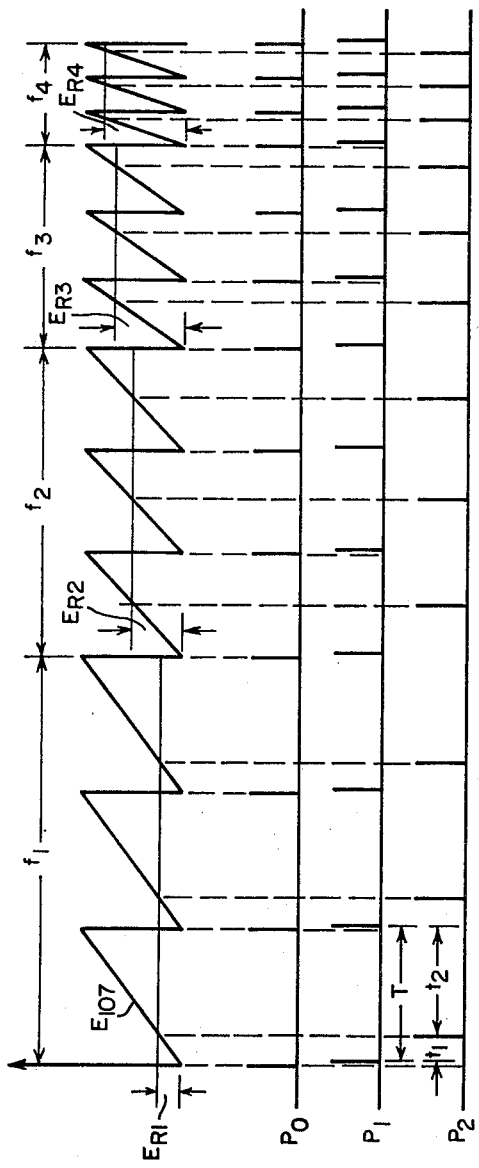

United States Patent Office 3,493,838
Patented Feb. 3, 1970

3,493,838
STATIC FREQUENCY CONVERTER WITH
NOVEL VOLTAGE CONTROL
Laszlo Gyugyi, Penn Hills, Pittsburgh, and Brian R. Pelly, Murrysville, Pittsburgh, Pa., assignors to Westinghouse Electric Corporation, Pittsburgh, Pa., a corporation of Pennsylvania
Filed Apr. 21, 1967, Ser. No. 632,786
Int. Cl. H02m 5/14, 5/16, 5/30
U.S. Cl. 321—7    17 Claims

ABSTRACT OF THE DISCLOSURE

Apparatus shown is a frequency converter including a three-phase to three-phase system, wherein for each output phase there is a three-phase input bridge-type frequency converter having six conversion phases operating on six uniformly time-spaced line-to-line alternating voltages implicit in a three-phase supply. Each of the six arms of the bridge is provided with a bi-lateral controlled static switch, and a control circuit operates the switches in a cyclic pattern of successive different permutations each including a pair of switches. The repetitive pattern extends across a plurality of successive time frames. Each permutation is effected at least once during the pattern, and at least one permutation is effected at least some time during each frame of the pattern. Each permutation connects a different one of the six voltages to the load circuit, whereby the successive permutations successively connect to the load circuit, increments of the input voltages in a certain order to provide an output frequency equal to the difference between the power input frequency and the cyclic rate of the aforesaid pattern. The control circuit includes adjustable means for varying the duration of connection of each voltage within and relative to the length of a frame thereby to control the magnitude of the average output voltage. One version of the control circuit also has provisions to short the load within the time span between the end of each voltage connection and the start of the next voltage connection. Another control modification provides a cyclic switching pattern wherein successively operated switching units alternately connect opposite polarity voltages to the load circuit in a controllable ratio of positive-to-negative durations, thus to control the average output voltage. The described apparatus also includes a unique arrangement for maintaining substantially constant output volts-per-cycle by linearly varying with output frequency, the duration of connection of each input AC voltage increment relative to the length of the time frame.

RELATED CASE

The arrangement for maintaining substantially constant output volt-per-cycle included in this disclosure is claimed in U.S. Patent application No. 632,787 (Westinghouse Electric Corporation) filed concurrently herewith by the same applicants and assigned to the same assignee.

BACKGROUND OF THE INVENTION

Among the various schemes for producing a variable voltage output using switching devices is the direct frequency changer or "cycloconverter," in which the incoming power frequency is converted, in a single state of power conversion, to a variable frequency output.

There are two basic types of static switch type cycloconverters. In one type, discontinuous control type switches such as thyratrons, thyristors, etc., are turned OFF by "natural" means, that is, the firing takes place so that commutation is always achieve by insuring that the voltage difference between the "outgoing" and the "incoming" switches is of the correct polarity. The switch which is fired is always at a higher potential in the direction of current flow than the switch which was conducting.

In this first type of cycloconverter, turn OFF is dependent on the momentary magnitudes of the input AC voltages to which the switches may be subjected. The other basic type of static switch cycloconverter is one in which it is possible to turn off the switching devices at any desired instant regardless and independently of the momentary magnitudes of the input AC voltages across the switches. For convenience, the latter type shall be referred to as "artificially commutated" in contradistinction to the first type or "naturally commutated." An example of an artificially commutated cycloconverter is disclosed in U.S. Patent No. 3,170,107 to R. B. Jessee. One of the advantages of the artificially commutated cycloconverter as compared to the naturally commutated type, is that the former can provide output frequencies over a range including frequencies on both sides of the input frequency, while the naturally commutated type cycloconverter is restricted to the production of output frequencies below the input frequency. Before the invention herein, the field of application of artificially commutated cycloconverters was considerably restricted because, although frequency control was possible, control of the output voltage could not be achieved, except by controlling the input voltage. This scheme could not, therefore be economically applied to certain purposes, for example, the control of an AC machine, wherein it is necessary to keep the voltage-to-frequency ratio and thereby the airgap flux constant.

SUMMARY

The present invention is related to artifically commutated frequency converters and provides simple and economical output voltage control by means of a novel scheme which controls the dwell times (conduction angles) of the frequency converting switching devices.

In accordance with one embodiment of the invention the signals of a train of signals defining a train of successive time intervals or frames are employed to successively trigger a plurality of respective frequency converting switching units in successive time frames, with means for controlling the conduction angle or dwell time of each switching unit within and relative to its associated time frame. In accordance with one control circuit the load is shorted in that portion of each time frame that is "unoccupied" by a dwell time of the associated switching unit. In another control embodiment, the switching units are triggered to provide switching dwell periods of alternately reversed modes in each interval, and means is provided to control the ratio between reversed modes thereby to control the output voltage.

It is therefore a principal object of the invention to provide a novel method for controlling the frequency converting switching units of an artificially commutated frequency converting apparatus in order to control the output voltage thereof.

Another major object of the invention is to provide a novel method for controlling the output voltage of an artifically commutated cycloconverter.

Another object of the invention is to provide novel apparatus for controlling the output voltage for an artificially commutated cycloconverter.

Another object of the invention is to provide a system for accurately controlling the output voltage of an artificially commutated cycloconverter.

Yet another object of the invention is to control the output voltage of an artificially commutated cyclocon- verter by controlling the dwell time of the frequency converting switching units.

A further object of the invention is to provide simple and economical apparatus for controlling the output voltage of an artificially commutated cycloconverter.

The voltage control of the present invention is simple and easy to implement, and gives inherent phase and amplitude balance between cycloconverter output phases. At the same time, all the desirable features of the original basic artificially commutated cycloconverter are retained, for example wider frequency range, no subharmonics, and the frequency of the lowest harmonic component is widely separated from the fundamental. The system of the invention is well suited to control the speed of AC machines.

Other and further objects and advantages of the invention will become apparent from the detailed description given therein taken in connection with the accompanying drawings.

In the drawings:

FIG. 6B is a supplementary chart showing signals for operating the bridge frequency converters of FIGS. 3 and 7 in accordance with another embodiment of the invention;

FIG. 10 is a chart with curves illustrating operation of the bridge cycloconverters of FIGS. 3 and 7 in accordance with another embodiment of the invention;

FIG. 11 is a diagram illustrating a modification of the control system in FIG. 7 for providing operation as illustrated in FIG. 10;

FIG. 12 illustrates an alternative example for one part of the control circuit in the system of FIG. 7;

FIG. 13 is a chart illustrating operation of a part of the control circuit of FIG. 7 which examples provides constant output volts per cycle in the output circuit;

FIG. 14 is a diagram of a detailed circuit for implementing or mechanising the control example of FIG. 12;

Figure 1:
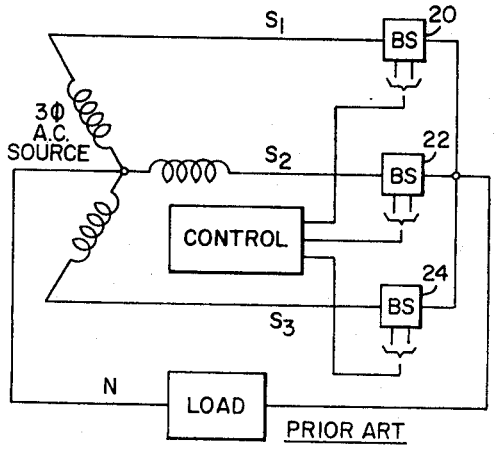
FIG. 1 is a diagram of a half bridge-type artificially commutated cycloconverter.
Figure 2:
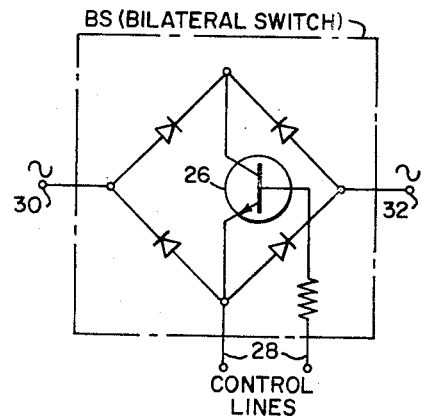
FIG. 2 is a diagram of one example of the controlled bilateral switch employed in the circuits of FIGS. 1, 3 and 7.

The cycloconverter in FIG. 1 has a three-phase input and three conversion phases. It is of the half-wave type also known as a half-bridge. In the cycloconverter of FIG. 1, uniformly time-spaced alternating voltages (line-to-neutral in this case) from the three phase source are repetitively applied in succession in their phase order to the load at a chosen repetition rate to provide an output frequency equal to the difference between the input frequency and the chosen repetition rate. More specifically three different pairs of input lines ($S_1$–N, $S_2$–N, and $S_3$–N) are sequentially connected to the load by successively operating three controlled static bilateral switch units BS indicated at 20, 22 and 24. Each switch unit when turned ON interconnects a different pair of the input lines and the load. Each switching unit (in the configuration of FIG. 1) is a bilateral controlled static switch for example as shown in FIG. 2, artificially commutated by the control circuit. The circuit of FIG. 1, when conventionally controlled as taught by the prior art, has no provision for controlling the magnitude of the output voltage, except by the cumbersome system of controlling the input AC voltage source.

The bilateral switch shown in FIG. 2 is well known in the art and needs no explanation except to note that when transistor 26 is turned ON by an appropriate signal on control lines 28, power current will flow in either direction between the main switch terminals 30 and 32. Thus the switch is in the "closed mode." In the absence of a turned-ON signal on the control lines 28, transistor 26 will be turned OFF and no power will flow between terminals 30 and 32. This is the "open mode" of the switch.

The interval between turn-ON and turn-OFF of a switch may be referred to as "conduction interval," "conduction dwell time," or "conduction angle," these terms being synonymous.

Figure 3:
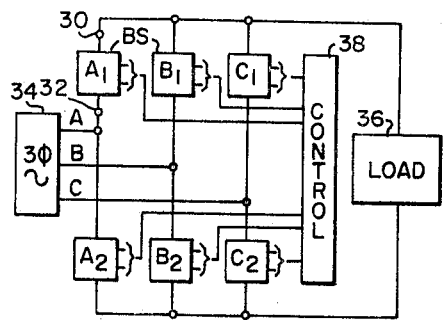
FIG. 3 is a diagram of a full bridge type artificially commutated cycloconverter.

FIG. 3 shows another configuration of cycloconverter wherein a plurality of uniformly time-spaced alternating voltages (in this case line-to-line voltages) are sequentially applied to the load. The apparatus in this figure supplies a single-phase output.

Figure 4:
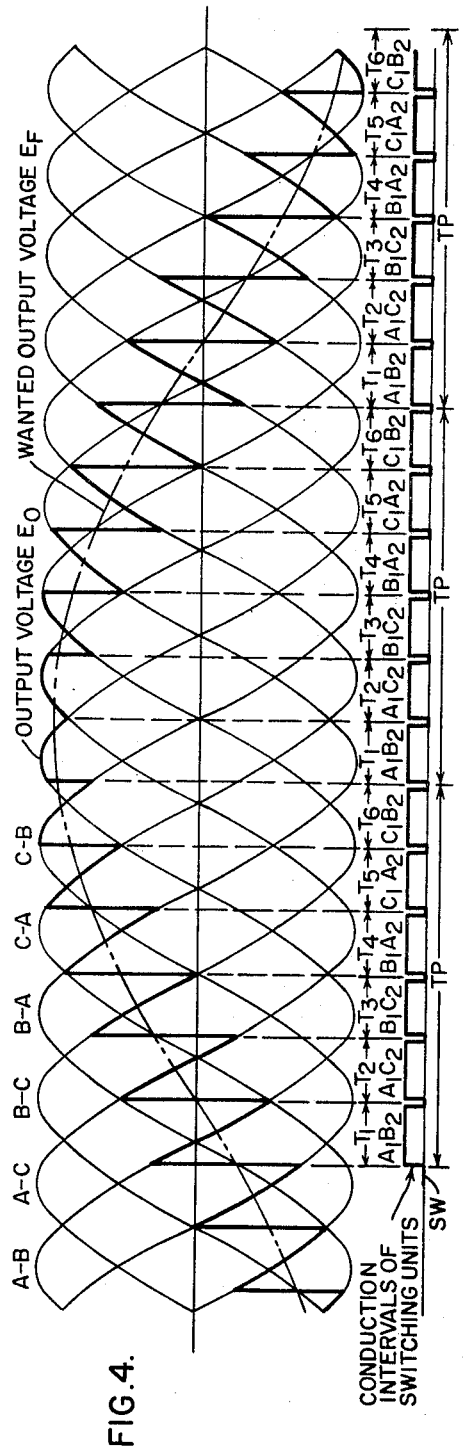
FIG. 4 is a chart showing curves illustrating operation of the bridge of FIG. 3 employing conventional artificial commutation.

In FIG. 3 a three phase AC source 34 is connected to the input lines A, B and C of a three phase bridge type cycloconverter having six conversion phases for successively applying to the load 36 increments of six uniformly time spaced input alternating voltages A–B, A–C, B–C, B–A, C–A, and C–B, as depicted in FIG. 4. Voltage A–B is the voltage from input line A to input line B; voltage A–C is the voltage from input line A to input line C; voltage B–C is the voltage from input line B to input line C; voltage B–A is the voltage from input line B to input line A (reverse of voltage A–B); voltage C–A is the voltage from line C to line A (reverse of voltage A–C); and voltage C–B is the voltage from input line C to input line B (reverse of voltage B–C). Each of the six arms of the bridge has connected therein a controlled bilateral static switch BS, the switches in the individual arms being identified as $A_1$, $B_1$, $C_1$, $A_2$, $B_2$, and $C_2$. Each of these switches may, for example, be of the type shown in FIG. 2.

It may be noted that either in FIG. 1 or in FIG. 3, or for that matter in any circuit, it is possible to connect a pair of input lines to a load in two reversely related modes. For example, in FIG. 1 one mode of connection involving lines $S_2$ and N would be to connect lines $S_2$ to the right side of the load, and line N to the left side of the load as shown in FIG. 1. On the other hand, a reverse mode of connecting these lines to the load would be to connect line $S_2$ to the left side of the load while connecting line N to the right side of the load. Taking an example in FIG. 3, lines A and B may be connected to the load in one mode by turning switches $A_1$ and $B_2$ ON, thus connecting line A to the upper end of load 36 and line B to the lower end of load 36. Conversely, line A could be connected to the lower end of load 36 while line B is connected to the upper end of load 36 by turning ON, switches $A_2$ and $B_1$. Since switches $A_1$ and $B_2$ are required to connect lines A and B to load 36 in one of the possible connection modes these switches collectively may be referred to as a switching unit $A_1B_2$. In like manner switches $A_1$ and $C_2$ when turned ON, connect the input lines A and C to the load in one possible mode, while switches $A_2$ and $C_1$ connect the lines A and C to the load 36 in a reverse mode. Similarly lines B and C are connectable to the load by turning switches $B_1$ and $C_2$ ON, and in the reverse mode by turning ON switches $B_2$ and $C_1$. Thus, in the particular configuration of FIG. 3, connection of any pair of input lines to the load in either of possible reversely related modes requires a swtiching unit which includes at least two bilateral switches BS.

The switching unit involving switches $A_1$ and $B_2$ may be conveniently refered to as switching unit $A_1B_1$. Similarly the switching unit including switches $B_2$ and $A_1$ is conveniently referred to as switching unit $B_1A_2$. In like manner the other switching units are referred to as $A_1C_2$, $C_1A_2$, $B_1C_2$, $C_1B_2$.

It may be noted, that to connect two input lines to the load in FIG. 1 requires a switching unit having only one bilateral switch BS. On the other hand, to connect any pair of lines in FIG. 3 to the load requires a switching unit having at least two bilateral switches BS. It is thus seen that the respective switching units $A_1B_2$, $B_1A_2$, $A_1C_2$, $C_1A_2$, $B_1C_2$ and $C_1B_2$, when individually operated, can effect lines and the load, each of the circuit configurations involving the input lines and the load, each of the circuit configurations involving a pair of the input lines and the load in a particular one of the two possible reversely related modes of connection. Thus each of the switching units when turned ON provides a different one of six different circuit configurations between said input lines and the output circuit, each of said circut configurations interconnetcing the load and a pair of the input lines. For purposes of discussion, the individual bilateral switches BS are assumed to be perfect, that is they can be closed and opened at any given time instant, and when closed, the current is free to flow in either direction at all times.

Let it first be assumed that control circuit 38 is so arranged that switching units $A_1B_2$, $A_1C_2$, $B_1C_2$, $B_1A_2$, $C_1A_2$, $C_1B_2$, are allowed to conduct in that sequence for a fixed period of time T, so that each of the input line voltages is in turn connected across the load for the same interval of time, the sequence being repeated at a predetermined repetition rate R. As is illustrated in FIG. 4, this cyclic or repetitive switching pattern extends over a time period TP defined by six consecutive uniform time frames T, individually indicated at $T_1$, $T_2$, $T_3$, $T_4$, $T_5$, and $T_6$. Each switching unit is ON for a full time frame T as indicated by the switching curve SW in FIG. 4. This pattern of switching provides an output voltage wave $E_o$ having a "wanted" fundamental $E_F$ with a frequency $f_o$ equal to the difference between the frequency $f_{in}$ of the input alternating current and the repetition frequency $f_{sw}$ of the switching pattern. The system and above type of control which produces this output voltage waveshape is potentially well suited to the speed control of an AC machine for the following reasons: A wide output frequency range is possible; frequencies on either side of line frequency can be obtained; the transistion through line frequency is without incident; the frequency of the lowest harmonic component is widely separated from the "fundamental" frequency and there are no DC or subharmonic components.

While this type of control has its advantages it is considerably restricted in its field of application because, althought frequency control is possible, control of the output voltage cannot be achieved, except by controlling the input voltage. Thus this type of control cannot be economically applied to the speed control of an AC machine.

The conduction angle or dwell times of each switching unit is for the full extent (assuming perfect switches) of its associated time frame T. For example it is readily seen in FIG. 4, that for the time frame $T_1$, switching unit $A_1B_2$ applies the input voltage A–B to the load for the full duration of the frame. In the next frame ($T_2$), switching unit $A_1C_2$ is turned on to apply voltage A–C to the load for the full duration of the frame $T_2$, and so on.

Figure 5:
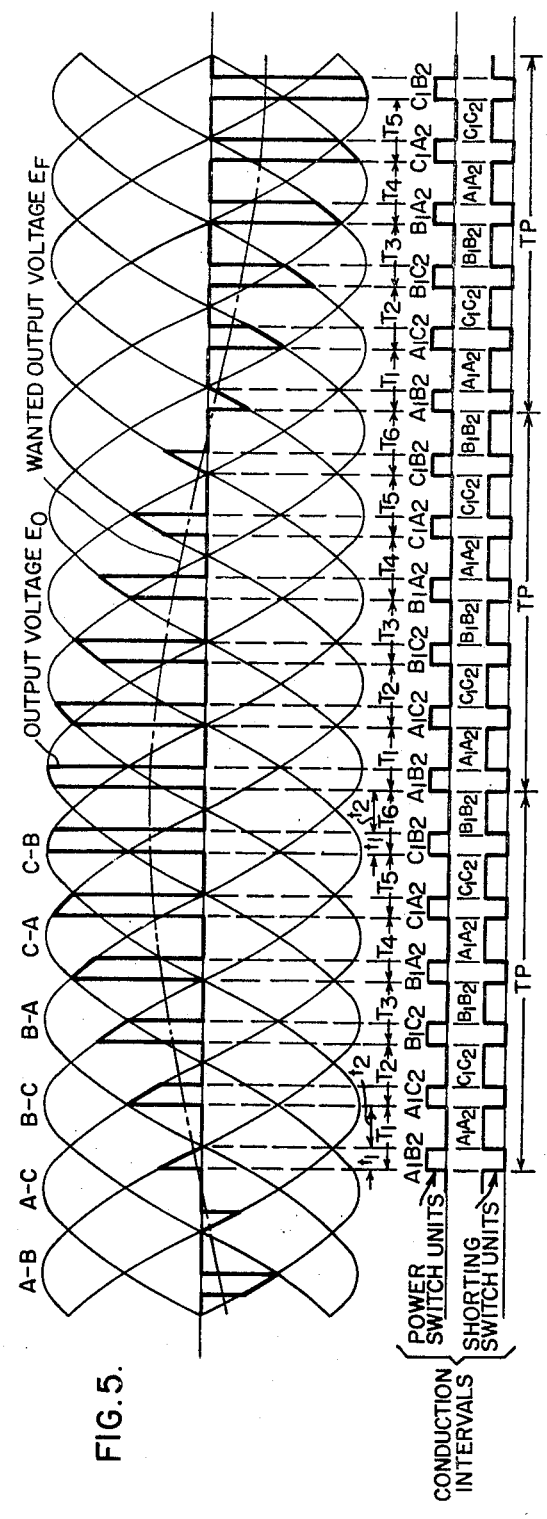
FIG. 5 is a chart with curves illustrating operation of the bridge frequency converter of FIG. 3 and the individual bridge converters of FIG. 7 in accordance with one embodiment of the invention herein.

In accordance with the invention the magnitude of the average output voltage is simply and accurately controlled by controlling the conduction angle (length of conduction dwell time) within and relative to the length of its associated time frame T, for example as illustrated by the curves in FIG. 5. In this figure as in FIG. 4, the six uniformly time spaced AC voltages, which characterize the three phase input power, are indicated in their phase rotation or order at A–B, A–C, B–C, B–A, C–A, and C–B. Each of the time frames T in FIG. 5 is subdivided into two portions $t_1$ and $t_2$ of controllable length relative to the length of the frame. During the period $t_1$ of any frame, the appropriate input line voltage is connected across the load by the turned ON switching unit associated with that time frame. However during the period $t_2$ of the frame, the input line voltage is disconnected from the load and the output terminals are short circuited, thereby providing a circulating path for the load current of an inductive load. Thus $t_1$ is the conduction angle or dwell time of an inpult voltage application, while the interval $t_2$ is the shorting interval. By controlling the ratio of the periods $t_1:t_2$, and at the same time maintaining their sum constant ($t_1+t_2$ is equal to T), the fundamental component of the output voltage can at any given frequency be continuously controlled from maximum to zero. With the bridge type circuit shown in FIG. 3, implementation of this embodiment of the invention requires no additional switching devices, since the short circuit which is applied during the period $t_2$ can be aplied through the two series connected bilateral switches in any "leg" of the bridge. This is illustrated in FIG. 5.

Referring now to FIG. 5, the repetitive switching pattern extends over a time period TP defined by six uniformly spaced time frames T labeled $T_1$, $T_2$, $T_3$, $T_4$, $T_5$ and $T_6$. In time frame $T_1$ switching unit $A_1B_2$ is turned on for the interval $t_1$. At the end of the interval $t_1$, shorting switch unit $A_1A_2$ (switches $A_1$ and $A_2$) is turned ON for the duration of interval $t_2$ to short the load. In the next time frame $T_2$, switching unit $A_1C_2$ is turned on for the duration of interval $t_1$ to apply an increment of input voltage A–C to the load. At the end of interval $t_1$ of frame $T_2$, switching unit $A_1C_2$ is turned off and shorting switching unit $C_1C_2$ is turned on for the duration of interval $t_2$ of the same frame to short the load. The rest of the sequence in the switching pattern should be apparent from examination of FIG. 5 In FIG. 5 the waveform $E_o$ illustrates the increments of output voltage, while the waveform $E_F$ shows the desired fundamental component of the output voltage.

Figure 8:
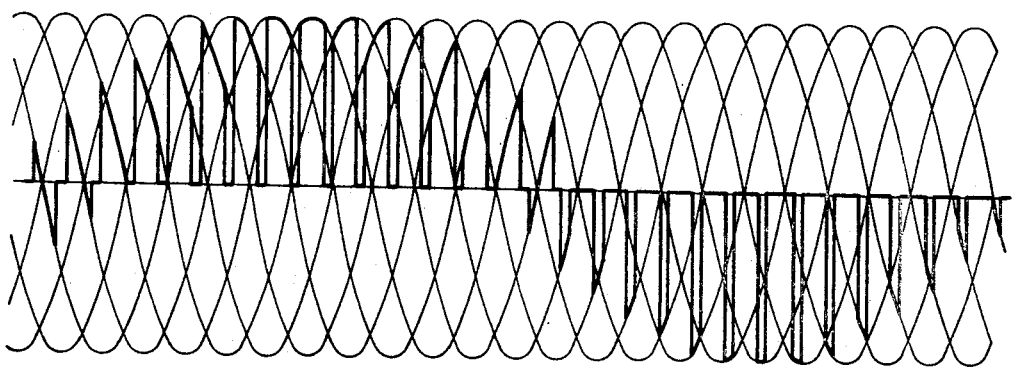
FIGS. 8 and 9 are curves further illustrating the operation of the bridge cycloconverter of FIG. 3 in accordance with the invention at different conversion frequencies and different output voltages per frequency.
Figure 9:
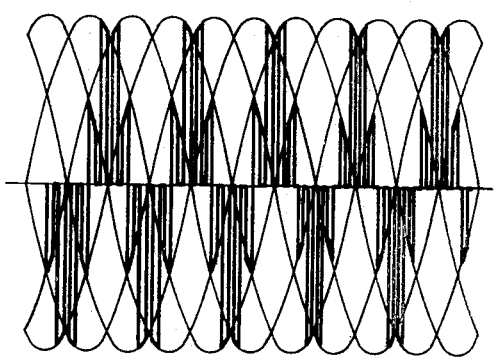

FIGS. 8 and 9 illustrate the effect on the average output voltage magnitude by varying the conduction dwell time of the power switching units relative to the length of the associated time frame T. In FIG. 8 the output frequency is equal to ⅓ of the input frequency and the duty cycle of the conduction dwell times of the power switching units is longer in the left half of FIG. 8 than it is in the right half of this figure. Thus the left half of FIG. 8 produces a higher average output voltage than the right half of the figure. In FIG. 9 the output frequency is equal to three times the input frequency, and again the left half of the figure shows longer switching unit duty cycles than the right side of the figure.

Figure 6A:
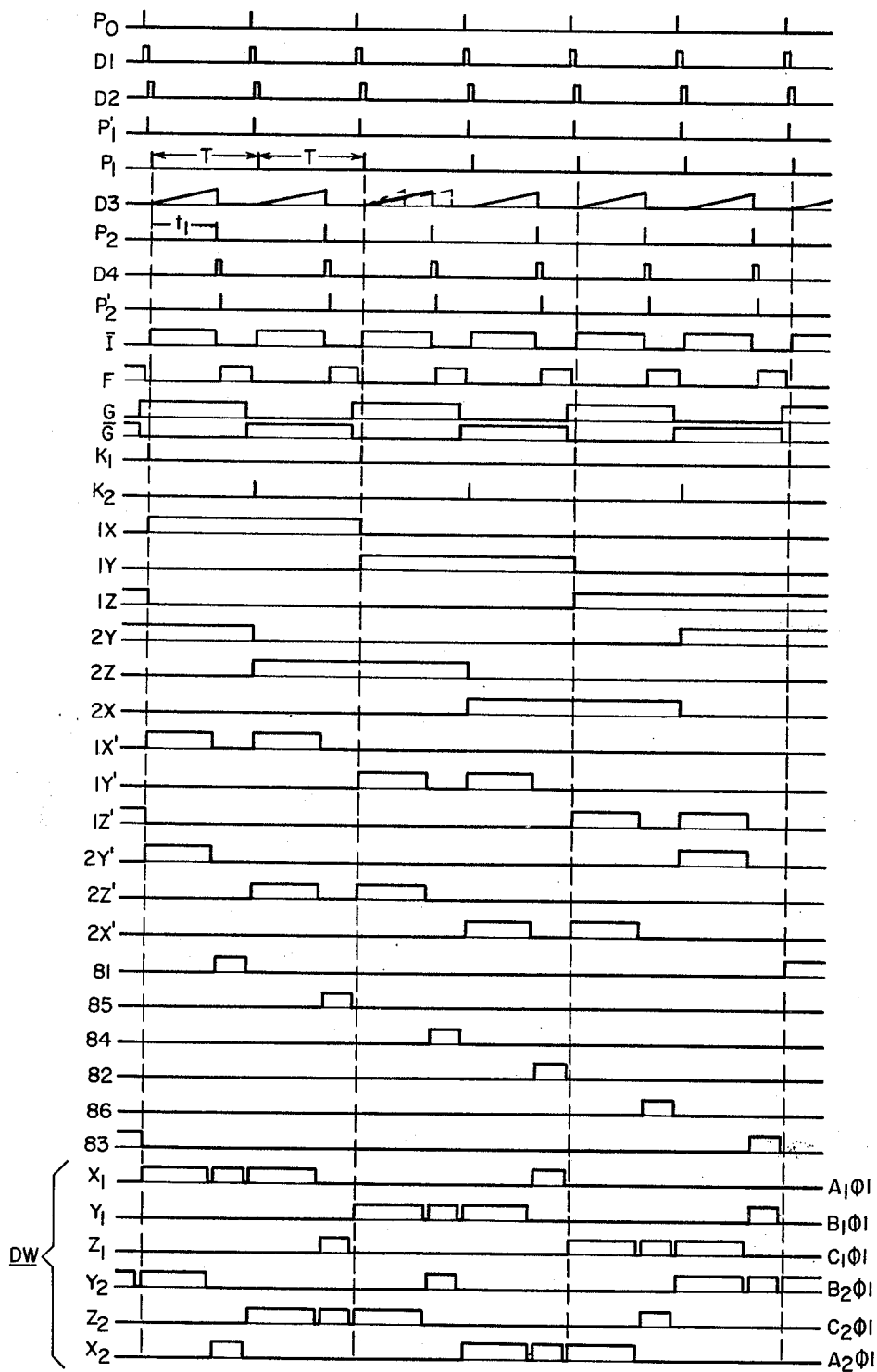
FIG. 6A is a chart illustrating switch control signals (and derivation thereof) for operating the bridge frequency converters of FIGS. 3 and 7, in accordance with one embodiment of the invention.

In FIG. 6A, the last six curves DW are examples of drive waveforms for the bilateral switches of FIG. 3, which will produce the results illustrated in the curves of FIG. 5. Each of the six curves has at its right end, a reference character with a prefix corresponding to the associated bilateral switch, that is curve $A_1\phi_1$ is the drive waveform for switch $A_1$, curve $B_1\phi_1$ is the drive waveform for switch $B_1$, etc. The group of waveforms DW provides six similar waveforms 60° apart. An example of how the control circuit 38 of FIG. 3 may be arranged in order to provide the drive waveforms illustrated in FIG. 6A for operation of the bridge cycloconverter of the bridge cycloconverter of FIG. 3 in accordance with the invention as exemplified in FIG. 5, is illustrated in FIG. 7.

Figure 7:
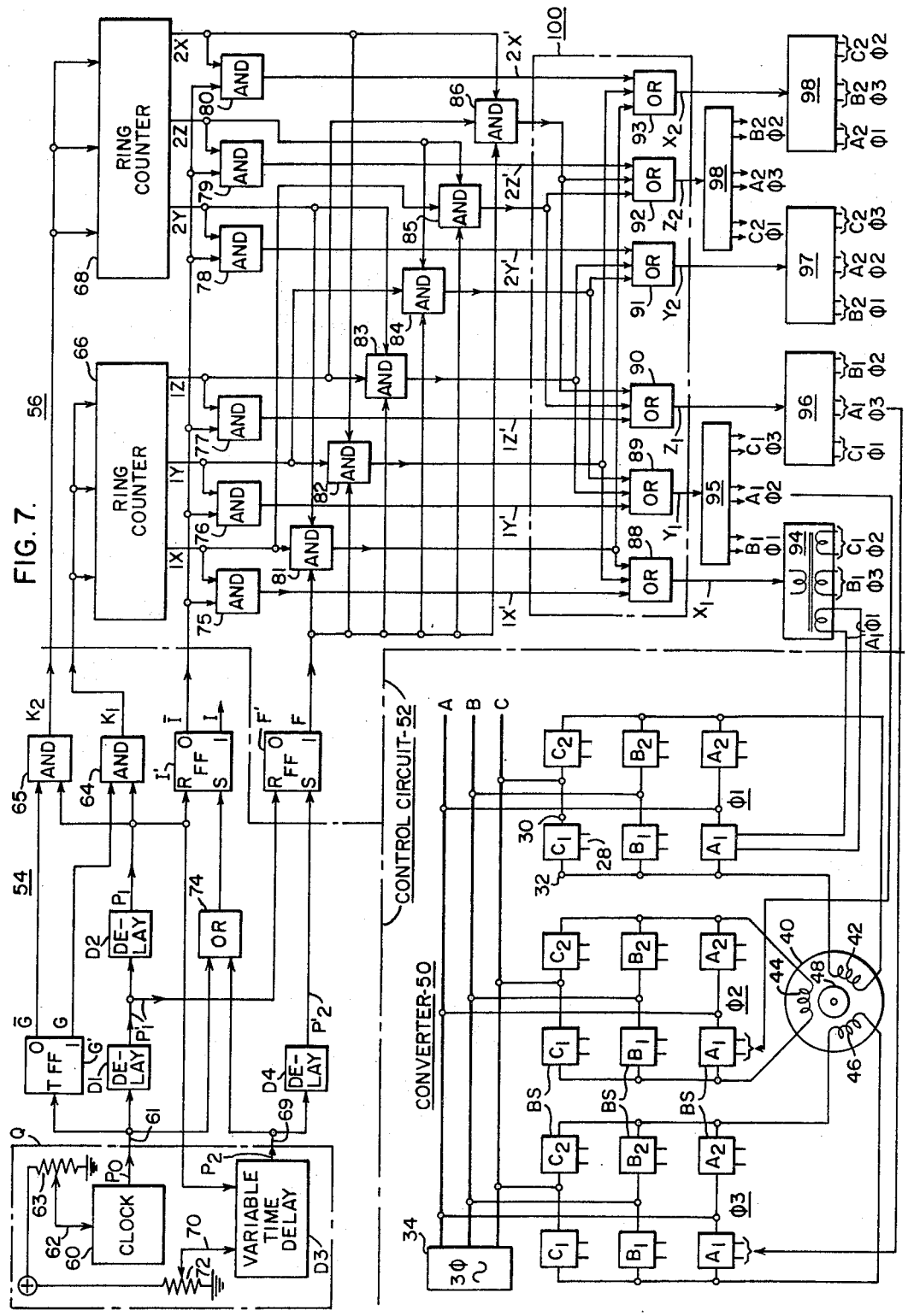
FIG. 7 is a block diagram of a motor control system incorporating the embodiment of the invention illustrated by the curves of FIG. 5.

The system of FIG. 7 is arranged to convert the fixed frequency power of a three phase source 34 to a variable frequency, variable voltage, three phase output for supplying an AC machine 40, for example, the field or input of an induction motor, or a synchronous motor, or other. Machine 40 is provided with a rotor or armature 48 and a field having three phase windings 42, 44 and 46. For convenience the system in FIG. 7 may be divided into a power converter section 50, and a control circuit 52 for the converter section, with the control circuit 52 being further conveniently divided into a timing waveform generator 54 and a generating and distribution circuit 56 of the drive waveforms for the switches in the converter section 50.

Converter section 50 includes three converters $\phi 1$, $\phi 2$ and $\phi 3$, each supplying single phase power to a different phase of the machine 40. More specificaly, section $\phi 1$ supplies field winding 42; converter section $\phi 2$ supplies field winding 44; and converter section $\phi 3$ supplies field winding 46. The outputs of converter sections $\phi 1$, $\phi 2$ and $\phi 3$ are phased 120° apart, thereby in composite form supplying balanced three phase power to the motor 40.

Each of the converter sections $\phi 1$, $\phi 2$ and $\phi 3$ is a bridge type six phase frequency converter similar to the one shown in FIG. 3, and driven in accordance with the invention to produce waveforms of the type shown in FIGS. 5, 8 and 9 for each output phase. As in FIG. 3, each of the bridge converters of converter section 50 includes six static bilateral controlled switches BS indicated at $A_1$, $B_1$, $C_1$, $A_2$, $B_2$, and $C_2$. The switches in each of these converters are driven in accordance with the six drive waveforms DW at the bottom of FIG. 6A and referenced at their left ends as $X_1$, $Y_1$, $Z_1$, $Y_2$, $Z_2$ and $X_2$, except that the sets of drive waveforms for each of the converters is displaced 120° from the drive waveforms for the next converter. For example, if these drive waveforms are arbitrarily assigned to the switches of converter $\phi 1$ the distribution indicated at the right end of the waveforms, then the drive waveforms for converter $\phi 2$ will be the same except displaced by 120° from the $\phi 1$ set of drive forms, and the drive waveforms for converter $\phi 3$ will be the same except displaced 120° from the drive waveforms of converter $\phi 2$. Control circuit 52 produces the set DW of drive waveforms and distributes them to the three converters $\phi 1$, $\phi 2$ and $\phi 3$.

The timing waveform generator 54 is provided with a clock generator 60 whose output frequency is adjustable in response to adjustment of the magnitude of a reference voltage applied through line 62 from a reference voltage source symbolized by a potentiometer 63 connected across a suitable voltage source. Note that the various pulse and logic outputs and time delay periods referred to in the following description are illustrated in the chart of FIG. 6A wherein all the curves are along the same relative time base. The output of generator 60 on line 61 consists of a train of short duration pulses $P_0$, uniformly spaced and occurring at regular time intervals and fed to a fixed time delay circuit D1 whose output pulses $P'_1$ are fed to the reset terminal of a flip-flop F' and to another time delay $D_2$ whose output pulses $P_1$, delayed with respect to the pulses $P_0$, are separated into two pulse trains $K_1$ and $K_2$. This is accomplished by using the clock pulses $P_0$ to trigger a common-trigger type flip-flop G', producing two rectangular pulse trains, G and $\overline{G}$. Since pulses G always overlap, say the even $P_1$ pulses, and the $\overline{G}$ pulses overlap the odd $P_1$ pulses, pulses $K_1$ and $K_2$ are obtained by feeding pulses G and $P_1$ and $\overline{G}$ and $P_1$ respectively, to two AND gates 64 and 65. Pulses K1 and K2 are fed to the inputs of two three-stage ring counters 66 and 68, respectively. The outputs of the ring stage ring counters 66 and 68, respectively. The outputs of the ring counter 66 are on lines 1X, 1Y and 1Z, and are shown under the same designations in the chart of FIG. 6A. The outputs of the ring counter 68 are on lines 2X, 2Y and 2Z, and their waveforms are shown under the same designations as FIG. 6A.

Pulses $P_1$ are also fed to a variable delay circuit $D_3$, providing on line 69 output pulses $P_2$, delayed by a time $t_1$ with respect to pulses $P_1$. Time delay $D_3$ may be any suitable adjustable time delay, for example adjustable in response to the magnitude of a reference voltage supplied on a line 70 from an adjustable reference voltage source symbolized by a potentiometer 72 connected across a suitable source of voltage (not shown). For example, delay D3 may be an adjustably timed ramp function generator or a monostable circuit whose output trailing edge is differentiated to produce the pulses $P_2$. The adjustable timing waveform of the delay D3 may be symbolized by the curve labeled D3 in FIG. 6A with two random adjustments shown in dotted form. Output pulses $P_2$ are fed to an OR gate 74 along the pulses $P_0$. The output of OR gate 74 is connected to the "set" terminal of a flip-flop I', whose reset terminal is connected to the output of delay D2 to receive pulses $P_1$. Flip-flop I' is switched into the SET position either by the delayed pulse $P_2$ or, in the event of the time delay setting of delay D3 being greater than the interval between pulses $P_1$ and the reset pulses $P_0$, then by the latter pulse $P_0$. Thus pulses $P_0$ serve as "end stop" pulses and mark the limits of periods $t_1$. Since the delay between pulses $P_0$ and $P_1$ is relatively short, the maximum possible time, $t_1$ is nearly equal to the time T. Under this condition the maximum possible practical output voltage is obtained from the cycloconverter. Flip-flop I' is reset by pulses $P_1$; its outputs are I and $\overline{I}$.

As will become clear from the continuing description herein, pluses $P_1$ are used to initiate conduction of the power transfer switching units, and pulses $P_2$ at the same rate, but adjustably displaced by a chosen time interval $T_1$ are employed to terminate the conduction dwell times of these switching units, and to initiate conduction of the shorting switching units. Thus pulse train $P_1$ will determine the output frequency and pulse train $P_2$ will determine the output voltage. By varying the positions of pulses $P_2$ relative to pulses $P_1$, the ratio of conduction intervals or dwell time $t_1$ to conduction dwell time $t_2$ is varied. Thus varying the magnitude of the average output voltage.

Pulses $P_2$ are also transmitted through a delay $D_4$ to provide pulse train $P'_2$. Since pulse train $P'_2$ is delayed with respect to pulse train $P_2$ by a short time which is necessary to turn OFF the power transfer switching units, pulses $P'_2$ can be used to initiate the conduction of the "shorting" switching units. A pulse train $P'_1$ out of the output of delay D1 slightly precede pulse $P_1$ which initiate the successive power transfer switching units. Thus pulse $P'_1$ may be employed to terminate the previous "shortening" conduction interval. To this end, pulse train $P'_2$ is applied to the SET input of flip flop F', and pulse train $P'_1$ is applied to the RESET input of this flop-flop. Thus the output of this flip-flop gives a continuous signal F (FIG. 6A) corresponding to the conduction interval or dwell time of the "shorting" switching units. As described later the signal F is distributed by a sequential logic to the appropriate "shorting" switching units.

Thus a single pulse train with an even rate of pulses per second is employed to initiate the interval $t_1$, and a second pulse train, with the same even rates, but with an appropriate displacement relative to the first train is employed to end the time period $t_1$ and to initiate the time interval $t_2$.

As seen in FIG. 7, the outputs IX, 1Y, and 1Z of ring counter 66 are respectively connected to one input of AND gates 75, 76 and 77. In like manner the outputs 2Y, 2Z and 2X of ring counter 68 are respectively connected to one input of AND gates 78, 79 and 80. The output $\overline{I}$ of the flip-flop I' is fed to each of the other input terminals of AND gates 75, 76, 77, 78, 79 and 80, at the respective outputs of which waveforms 1X′, 1Y′, 1Z′, 2Y′, 2Z′, and 2X′ are obtained in (FIG. 6a). These are the basic drive waveforms for rendering conductive the power transfer switching units during the time intervals $t_1$. As previously described, pulses F define the intervals $t_2$ during which the "shorting" switching units conduct. These pulses are distributed into six separate pulse trains in a cyclic manner in the following manner. Pulses F are fed to one input of each of AND gates 81, 82, 83, 84, 85 and 86. Second inputs of AND gates 81, 82, 83, 84, 85 and 86, are respectively connected to ring counter outputs 1X, 1Y, 1Z, 1Y, 1X, and 1Z (FIG. 7). Third inputs of AND gates, 81, 82, 83, 84, 85 and 86 are respectively connected to ring counter outputs 2Y, 2X, 2Y, 2Z, and 2X. The outputs of the six AND gates 81–86 are indicated at corresponding reference initia in FIG. 6A, and are fed as indicated in FIG. 7 to six OR gates 88–93 to which the outputs of the six AND gates 75–80 are also fed. More specifically, the outputs of AND gates 81 and 82 are applied to inputs of OR gates 88 and 93; outputs of AND gates 83 and 84 to OR gates 89 and 91; and outputs of AND gates 85 and 86 to OR gates 90 and 92. Outputs 1X′, 1Y′, 1Z′, 2Y′, 2Z′ and 2X′ are respectively fed to OR gates 88, 89, 90, 91, 92, and 93. The outputs of these OR gates are indicated in FIGS. 7 and 6A at $X_1$, $Y_1$, $Z_1$, $X_2$, $Y_2$, and $Z_2$. These are the complete gating waveforms which are distributed in 120° apart sets to the bilateral switches of the respective converters $\phi 1$, $\phi 2$ and $\phi 3$ in the following manner.

Outputs $X_1$, $Y_1$, $Z_1$, $X_2$, $Y_2$ and $Z_2$ are respectively applied to the inputs of six similar isolating distribution circuits 94–99. Distributor 94 distributes the output $X_1$ to switch $A_1$ of converter $\phi 1$, to switch $B_1$ of converter $\phi 3$, and to switch $C_1$ of converter $\phi 2$. Distributor 95 distributes output $Y_1$ to switch $B_1$ in converter $\phi 1$, to switch $A_1$ in converter $\phi 2$, and to switch $C_1$ in converter $\phi 3$. The distributor 96 routes output $Z_1$ to switch $C_1$ in converter $\phi 1$, to switch $A_1$ to converter $\phi 3$, and to switch $B_1$ in converter $\phi 2$. Distributor 97 transmits output $Y_2$ to switch $B_2$ of converter $\phi 1$, to switch $A_2$ of converter $\phi 2$ and to switch $C_2$ of converter $\phi 3$. Distributor 98 directs output $Z_2$ to switch $C_1$ in convert $\phi 1$, switch $A_2$ in converter $\phi 3$ and switch $B_2$ in converter $\phi 2$. Distributor 99 distributes output $X_2$ to switch $A_2$ in converter $\phi 1$, to switch $B_2$ in converter $\phi 3$ and to switch $C_2$ in converter $\phi 2$.

Figure 17:
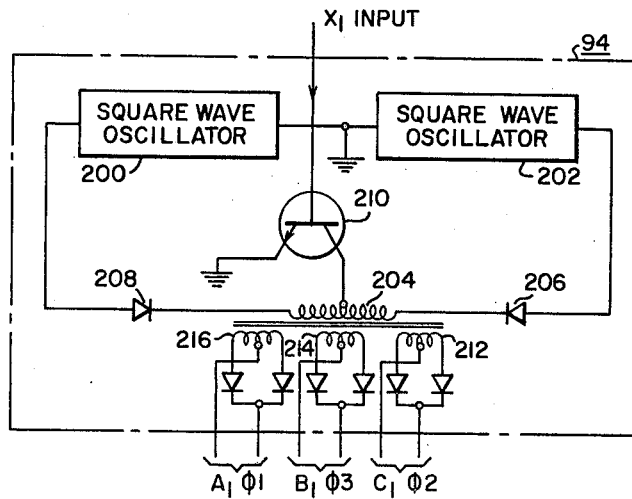
FIG. 17 is a diagram of a specific example of the distributors in FIG. 7.

Due to the asymmetric nature of the drive waveforms, a convenient technique for isolated distribution is carrier modulated switching. An example of such a distributing circuit is shown in FIG. 17 and although the circuit in this figure is indexed by specific reference numerals to "fit" within the distributor box 94, it may be employed in the case of each of the distributors 94–99. A carrier-modulated switching circuit of the general type employed in FIG. 17 may be seen in U.S. Patent application Ser. No. 520,497 (John Rosa). In FIG. 17, a carrier is provided by two high frequency square wave generators 200–202 (both same frequency), which are connected in push-pull to the transformer primary 204 through diodes 206–208 and a switching transistor 210 driven by the input line to the distributor. Transformer secondaries 212–214–216 provide isolated outputs that are full wave rectified and transmitted to the control lines 28 of the bilateral switches. Input DC pulses driving the switching transistor 210 in FIG. 17, modulate the high frequency carrierin accordance with the switching waveforms applied to the inputs of the distributing circuits, thus producing in the output, after full wave rectification, an envelope that is the replica of the input. The high frequency square wave generator 200–202 in FIG. 17 should provide a carrier having substantially higher frequency than the input switching pulses. Preferably the carrier frequency should be high enough to provide several cycles during the shorted input switching pulse. The two square wave generators may for example be the respective halves of a free running multivibrator with a suitable common connection.

From the above distribution pattern, it will be apparent that with respect to time, the waveforms DW correspond with those applied to the switches of converter $\phi 1$ as indicated to the right of these waveforms in FIG. 6A. These waveforms are displaced 120° for the switches of converter $\phi 2$ and another 120° for the switches of $\phi 3$, whereby correspondingly referenced switching units in the three converters are displaced 120° apart. Thus the system in FIG. 7 provides operation in accordance with the invention wherein each of the converters $\phi 1$, $\phi 2$ and $\phi 3$, provide an output as illustrated in FIG. 5 but displaced 120° apart for the three converters, thereby providing three phase power supply to the motor 40. It should be apparent from the description herein, that adjusting the frequency of clock 60 will adjust the output frequency of the system, and that adjustment of the time delay D3 will adjust the ratio $t_1$ to $t_2$ and thereby adjust the magnitude of the output voltage.

It should be apparent that the control circuit 52 of FIG. 7 may be employed as the control circuit 38 in FIG. 3 to operate the cycloconverter of that figure in accordance with the invention to provide the operation illustrated in FIGS. 5, 8 and 9.

As an alternative for effecting adjustable output voltage control, the control circuit in FIG. 7 may be modified whereby instead of short-circuiting the output terminals during the period $t_2$, the reverse of the line voltage applied to the output terminals during the time $t_1$ of a time frame T is applied to the output terminals during time interval $t_2$ of the frame T by modification of the switching pattern extending across time TP as illustrated in FIG. 10. It should be realized that in the same manner as FIG. 5, FIG. 10 illustrates operation of one of the output phases of a system, that is one of the converters $\phi 1$, $\phi 2$ and $\phi 3$, the waveforms for the other converters being 120° apart.

Analyzing FIG. 10, it is seen that in each time frame T of the repetitive switching pattern extending across frames $T_1$ to $T_6$, reversely related voltages are applied to the load during the respective sections $t_1$ and $t_2$ of the frame. In this figure, switching curve SW1 indicates the switching units involved and their conduction times in applying increments of successive input AC voltages to the load during sections $t_1$ of the time frames T of the switching pattern. In like manner, switching curve SW2 indicates the switching units and their conduction times involved in applying during the respective sections $t_2$, increments of successive input AC voltages, each reversely related to the voltage applied during the section $t_1$ of the same frame T. For example, during section $t_1$ of frame $T_1$, switching unit $A_1B_2$ conducts to apply an increment of the voltage B–A to the load. During section $t_2$ of the same frame $T_1$, switching unit $B_1A_2$ conducts to apply an increment of the voltage B–A to the load. It will be noted that the voltages A–B and B–A are reversely related or 180° apart. Picking another frame during the same switching pattern say frame $T_3$, it is seen that the switching unit $B_1C_2$ applies an increment of the input voltage B–C to the load during section $t_1$ of that frame, and that during section $t_2$ of that frame, switching unit $C_1B_2$ conducts to apply an increment of the input voltage C–B to the load. Again it will be observed that the voltages B–C and C–B are oppositely related or 180° apart. The rest of the switching pattern should be apparent from the previous description and the illustration in FIG. 10.

To provide the operation illustrated in FIG. 10, the drive waveforms DW (FIG. 6A) are modified so that they appear as in FIG. 6B. The derivation of the waveforms in FIG. 6B may be comprehended by substituting these waveforms in place of the last six waveforms in FIG. 6A. To produce these waveforms the logic circuit 56 is modified for example by substituting the circuit in FIG. 11 for the circuit portion enclosed in that dot-dash box 100 in FIG. 7.

With the logic and distributing circuit 56 of FIG. 7 modified in accordance with FIG. 11 it is seen that the outputs IX′, IY′, IZ′, 2Y′, 2Z′, and 2X′, are respectively applied to inputs of OR gates 88′, 89′, 90′, 91′, 92′, and 93′. The output from AND gate 81 is applied to OR gates 89′ and 93′. Output of AND gate 82 is applied to OR gates 88′ and 91′. Output of AND gate 83 is fed to OR gates 89′ and 92′. Output of AND gate 84 is supplied to OR gates 90′ and 91′. Output of AND gate 85 is applied to OR gates 90′ and 93′. Output of AND gate 86 is applied to OR gates 88′ and 92′. The outputs of these OR gates indicated at $X_1$, $Y_1$, $Z_1$, $Y_2$, $Z_2$ and $X_2$ are respectively distributed as the same referenced outputs in FIGURE 7.

Another arrangement, illustrated in FIGS. 12, 13 and 14, for providing pulse $P_0$ and $P_2$, and which may be employed in place of the clock 60 and the variable time delay D3 in FIG. 7, is described in the following paragraphs in connection with a novel constant volts-per-cycle control claimed in U.S. patent application No. 632,787 (Westinghouse) filed by the same applicants concurrently herewith and assigned to the same assignee.

An important application of a cycloconverter is the speed control of AC machines. In this type of application, the output voltage must be linearly related to the output frequency in order to maintain the air gap flux of the machine constant over the entire speed range. In accordance with our invention claimed in the aforesaid U.S. Patent application No. 632,787 (Westinghouse), the ratio of the interval or delay angle $t_1$ to the time frame or angle T is made linearly variable with output frequency, i.e., the ratio $t_{1/T}$ is varied linearly with output frequency $f_0$, in order to vary the output voltage $E_F$ substantially linearly with output frequency $f_0$ in such manner that output voltage increases as the frequency is increased, thus to maintain substantially constant output volts-per-cycle Expressed in other terms, the conduction dwell time $t$, relative to the length of frame T is varied linearly with output frequency in order to vary the magnitude of the output voltage $E_F$ substantially linearly with output frequency $f_0$. This may be mathematically verified utilizing our following mathematical expression for the "wanted" fundamental component $E_F$ of the spectrum of the output waveform in the six conversion phase case.

$$E_F = \frac{6E_L}{\pi}\left[\cos\left(\frac{\pi}{3}+\frac{\pi t_2}{6T}\right)\right]\cos(2\pi f_0 t)$$

where $E_L$ for the particular example is line-to-line AC input voltage, $t$ is unit time, $f_0$ is output frequency, and $t_2$ and T are as hereinbefore defined. The term $\pi t_2/6T$ may be interpreted by lettering $\pi/3$ represent T; $2(\pi t_2/6T)$ represent $t_2$; and $$\frac{\pi}{3} - 2\left(\frac{\pi t_2}{6t}\right)$$

represent $t$. The above relation for $E_F$ shows that "wanted" output component $E_F$ varies cosinusoidally with $\pi t_2/6T$. The maximum output voltage occurs at $$\frac{\pi t_2}{6T} = 0°$$

and the output voltage becomes zero when $$\frac{\pi t_2}{6T} = \frac{\pi}{6} = 30°$$

Between the two extremes of $$\frac{\pi t_2}{6T}, \cos\frac{\pi}{3}+\frac{\pi t_2}{6T}$$

varies only between cos 60° and cos 90°, and, within these limits, the cosine function can be approximated well by a linear function:

$$f\left(\frac{\pi t_2}{6T}\right) = \frac{1}{2} - \frac{3}{\pi} + \frac{\pi t_2}{6T}$$

The maximum deviation of cos $$\left(\frac{\pi}{3}+\frac{\pi t_2}{6T}\right)$$

from the linear approximation of $$\frac{1}{2}-\left(\frac{3}{\pi}+\frac{\pi t_2}{6T}\right)$$

is about 3% is perfectly satisfactory for the application considered. It is also to be noted that if the angle of delay $t_1$ of pulses $P_2$ relative to $P_1$ is varied, then the output voltage varies linearly with the angle.

While the above mathematical development is for the specific "six conversion phase" case, applicants' invention, claimed as aforesaid in the copending patent application, wherein the ratio $t_1/T$ is varied linearly with frequency to produce substantially constant volts-per-cycle is true for the general case, regardless of the number of conversion phases, three, six, or other number of conversion phases, and whether it be star or bridge or other configuration.

The above concepts are implemented in the specific example shown, by generating a linear voltage ramp with appropriately defined amplitude between adjacent $P_1$ pulses and intercepting this "sawtooth" with a voltage which is proportional to the output frequency. The interception points determine the locations of pulses $P_2$. One example for providing this type of operation is illustrated in the block diagram of FIG. 12, wherein 102 indicates an integrator type analog to digital converter. This circuit block being essentially a linear "sawtooth" oscillator, is able to provide a variable frequency pulse train $P_0$ as well as a required linear voltage ramp between the successive pulses. The sawtooth waveform of the oscillator 102 is supplied along a line 104 to one input of a comparator 106, whose other input is supplied along a line 107 with a voltage which is proportional to the frequency of the pulse train $P_0$. More specifically, line 107 is connected to the output of a variable voltage reference symbolized by a potentiometer 72′ connected across a source of suitable voltage, and whose variable control 108 is ganged with the variable control 110 of a variable voltage reference source symbolized by a potentiometer 63′ connected across a source of suitable voltage. The output of the reference source 63′ is connected to a voltage responsive control input of the oscillator 102.

Oscillator 102 supplies an output whose frequency is linearly variable in response to the magnitude of the input reference voltage from reference source 63′, while the comparator 106 produces on its output line 112 an output pulse $P_2$ each time the "sawtooth" waveform intercepts the reference voltage received on line 107. Since the frequency of the analog to digital converter 102 is linearly proportional to a frequency reference DC voltage from source 63′, and since the variable control of this source is coupled to the variable control of reference source 72′, common operation of the controls 108 and 110 provides constant volts-per-cycle output when used to generate the pulses $P_0$ and $P_2$ in the system of FIG. 7.

For operation in the system of FIG. 7, the circuit of FIG. 12 is substituted for the circuit box Q in FIG. 7. The curves in FIG. 13 illustrate the operation of the circuit in FIG. 12 as the common control 114, linking controls 108 and 110, is operated to four different reference levels for respective output frequencies $f1$, $f2$, $f3$ and $f4$. The respective reference voltage levels on line 107 for these frequencies are indicated at $E_{R1}$, $E_{R2}$, $E_{R3}$ and $E_{R4}$. It is seen from the chart in FIG. 13 that pulses $P_2$ are formed at the intersection points of the voltage reference levels $E_R$ (received on line 107) with the sawtooth waves received on line 104. It is also seen from this chart that with increase of frequency, the interval or angle $T_1$ increases relative to internal T linearly with increase of frequency whereby the output volts increase with output frequency to maintain substantially constant output volts-per cycle.

An example of specific circuitry for the circuit blocks of FIG. 12 is illustrated in FIG. 14 wherein elements similar to those in FIG. 12 have corresponding reference indicia. It will be noted in FIG. 14 that reference potentiometers 63' and 72' are connected across a common source of DC voltage 116 through positive bus 115 and common bus 117. Potentiometer 63' has in series therewith a limiting resistor 118, and potentiometer 72' has in series therewith a resistor 120 and a variable resistor 122. The variable contact arms 108 and 110 of potentiometers 72' and 63' are coupled to a common control 114, whereby both controls 108 and 110 are adjusted simultaneously, one in accordance with the other. (Both in proportion to the variation of common control 114).

The analog to digital converter or oscillator 102 includes a transistor 124, a unijunction transistor 126, and a capacitor 128, along with diodes 130 and 132 and resistors 134, 136, 138, 140, 142 and 144, interconnected as shown.

A diode 30 in series with a junction 146 and a resistor 136 across the DC busses 115 and 117 bias the junction 146 to a particular desired level. The left side of the capacitor 128 is clamped to near the level of bus 115 through diodes 130 and 132. It may be noted that diodes 130 and 132, and resistors 138 and 140 provided a protective arrangement for transistor 124 when the unijunction transistor 126 breaks down in response to the voltage on the right side of the capacitor 128 reaching the breakover voltage value of the unijunction. Although the left side of capacitor 128 is clamped at near the voltage of the positive bus 115, the right side of the capacitor and the junction 148 are free to move in either direction.

Transistor 124 and unijunction 126 are connected in a circuit configuration forming a sawtooth oscillator, whose ramp output is linearized by Miller integrator type operation involving feedback from the collector of transistor 124 to its base through capacitor 128. The sawtooth output is taken off junction 148 and is generated by linear discharging of the capacitor 128 under control of transistor 124 to develop the ramp part of the output waveform until the breakover voltage of the unijunction 126 is reached. Upon breakover of the unijunction, the capacitor is charged generating the vertical trailing edge of the sawtooth wave, and at the same time providing on the output line 61 an output pulse $P_0$.

The slope of the ramp and therefore the frequency of the oscillator is dependent on the base current supplied to transistor 124 through resistor 134 from the reference source 63'. Adjustment of the contact arm 110 changes the reference voltage and thereby the base drive of transistor 124, thus in turn changing the frequency of the sawtooth waveform and the pulses $P_0$. To obtain a linear sawtooth wave, the circuit should be operated only in the linear region of the charging curve of the capacitor charging circuit. The voltage that is present at the variable tap 110 of potentiometer 63' corresponds to the frequency of the sawtooth oscillator, and because of the common coupling through common control 114, the voltage present at the variable tap 108 of potentiometer 72 also corresponds to or is representative of the frequency of the sawtooth oscillator. To obtain a particular volts/cycle value, the voltage at 108 is modified by adjusting rheostat 122, the "summed" drops are fed as a voltage reference along line 107 to one input of the comparator 106. The sawtooth wave is fed along line 104 to another input of the comparator.

In the comparator 106, transistor 150 and 152 with associated resistors are connected in a circuit configuration forming a detector for comparing the signals on lines 104 and 107, while a transistor 154 together with associated resistors and capacitors provides amplification and snap action to the output of the detector arrangement. Included in the comparator 106 are resistors 156, 158, 160, 162, 164, 166, 168, 170 and 180, together with a diode 174, and capacitors 176 and 178. The circuit parameters are such that normally transistors 150 and 154 are cut OFF while transistor 152 is turned ON (conducting) as a result of the base drive due to the reference signal on line 107. The sawtooth output of oscillator 102 is applied long line 104 to the base of transistor 150, and when the rising ramp voltage of the sawtooth becomes equal to the reference input applied to transistor 152, transistor 150 starts to conduct aided by regeneration through transistor 154, resistor 160 and capacitor 178, transistor 150 snaps to a high state of conduction and through emitter to emitter tie and the constant current constraint of resistor 170, transistor 152 sharply cuts off. Pulse $P_2$, which corresponds to the interception or crossing point of the reference and ramp voltages, is obtained at the junction 180 between capacitor 176 and resistor 156, and passes to the output line 69 through diode 174. Since the operation of the comparator 106 has no influence on the charging procedure of capacitor 128, this capacitor continues to discharge until its voltage reaches the breakover level of unijunction transistor 126, whereupon the unijunction "fires" supplying pulse $P_0$ on line 61 and charging capacitor 128 to its original level. After this, the same operation cycle starts again.

From the foregoing description of FIG. 14, it is evident that the switching frequency of repetition rate of the cyclic switching pattern and the output frequency to vary linearly with the voltage at arm 110, and by extension linearly with the common reference control 114. It is also evident from the description of FIG. 14, that the angle of delay between pulses $P_1$ and $P_2$, and therefore the conduction angle or interval $t_1$, vary relative to frame T, linearly with the reference voltage at potentiometer arm 108, and by extension with adjustment of the common reference control 114. Thus as the output frequency is varied by the common reference control, the output voltage varies substantially linearly with frequency to maintain substantially constant output volts-per-cycle.

It will be noted that as a concomitant, $t_2$ relative to T also varies linearly with frequency if $T_1$ relative to T is varied linearly with frequency. However, while both $t_1$ and $t_2$ relative to T vary linearly with frequency, one increases while the other decreases relative to T for any given direction of output frequency variation.

It should be evident from the description herein, that the oscillator 102 is adjustable to vary its output frequency by adjusting the value of the reference voltage supplied to the oscillator, and therefore the output frequency of the system may be adjusted or varied by adjusting or varying a reference voltage. In like manner, it should be apparent from the description herein, that the comparator 106 is adjustable to adjust or vary the delay angle of pulses $P_2$ by adjusting the value of the reference voltage supplied to the comparator 106, and therefore the value of output voltage of the system may be varied by adjusting the value of a reference voltage. It should also be appreciated that with proper selection of circuit parameters, the oscillator 102 and the comparator 106 may be arranged to respond linearly to a common reference voltage whose value may be adjusted manually, mechanically, or electrically, for example as a condition responsive signal or an error signal in a regulating system.

By way of example, the circuit components in FIG. 14 may have the following values:

Resistor:

| | | |
|---|---|---|
| 118 | ohms | 1,800 |
| 120 | do | 1,000 |
| 134 | do | 39,000 |
| 136 | do | 6,800 |
| 138 | do | 22 |
| 140 | do | 6,800 |

| | | |
|---|---|---|
| 142 | do | 220 |
| 144 | do | 33 |
| 156 | do | 1,000 |
| 158 | do | 15,000 |
| 160 | do | 2,200 |
| 162 | do | 10,000 |
| 164 | do | 1,000 |
| 166 | do | 100 |
| 168 | do | 100 |
| 172 | do | 15,000 |

Potentiometer:

| | | |
|---|---|---|
| 63 | do | 5,000 |
| 72 | do | 5,000 |

Capacitor:

| | | |
|---|---|---|
| 128 | fd | .022 |
| 176 | fd | .0033 |
| 178 | fd | .0051 |

Transistor:

| | | |
|---|---|---|
| 124 | Type | 2N3134 |
| 150 | Type | 2N2270 |
| 152 | Type | 2N2270 |
| 154 | Type | 2N3134 |
| Unijunction 126 | Type | 2N2647 |

It should be understood that the specific example of static bilateral switch BS illustrated in FIG. 2 for employment in FIGS. 3 and 7, is shown by way of example only and at any suitable bilateral switch may be employed. For example a solid state gate controlled switch which is similar to a silicon controlled rectifier except that it can be turned OFF as well as ON by suitable signals applied to the gate electrode. A suitable bilateral switch may be formed by connecting two such solid state gate controlled switches in parallel but oppositiely poled (sometimes referred to as back-to-back connection), which with suitable adaptation can be driven in accordance with the principles of the invention. Also a suitable bilateral switch may be formed by connecting in parallel two solid state controlled rectifiers (such as silicon controlled rectifiers) in oppositely poled relation (back-to-back relation) which with suitable adaptation can be controlled in accordance with the general principles of the invention.

Figure 15:
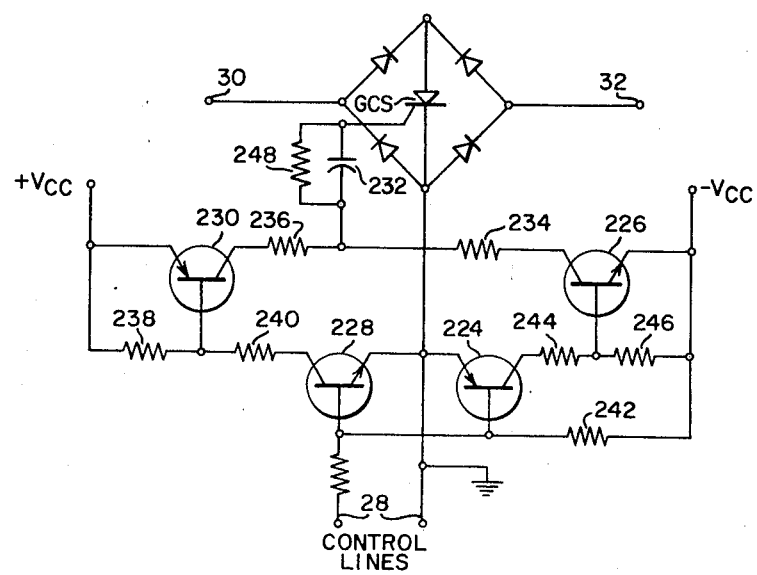
FIG. 15 is a diagram illustrating a drive adaptation for a solid state gate controlled switch which may be employed instead of the switching transistor in FIG. 2.
Figure 16:
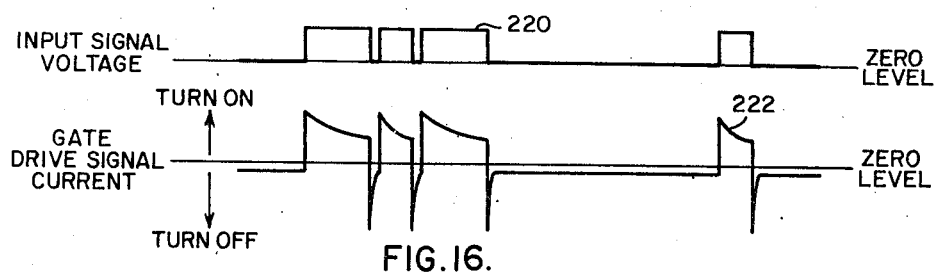
FIG. 16 is a chart of waveforms showing translation of voltages to current drive forms for both gate turn ON and gate turn OFF of the circuit in FIG. 15.

By way of further example. In FIG. 15 there is shown a suitable drive circuit for a gate controlled switch GCS employed in place of transistor 26 in FIG. 2. The isolated signals from the distributor circuits (FIG. 7) are connected to the control lines 28 for the drive circuit of FIG. 15 just as they are connected to the control lines 28 in the circuit of FIG. 2. The curves in FIG. 16 illustrate the output current waveforms applied to the gate of the gate controlled switch in response to the input voltage signals.

Curve 220 is the input signal on lines 28, and curve 222 is the output applied to the gate of the gate controlled switch. Operation is as follows: With no input signal, transistors 224 and 226 are ON and transistors 228 and 230 are OFF, and left side of the capacitor 232 is more negative than right side of capacitor. The gate of switch GCS is negative relative to the cathode. In response to positive input signal transistors 228 and 230 turn ON and transistors 224 and 226 turn OFF. A positive current wave passed by transistor 230 is transmitted with a spike leading edge through capacitor 232 to the gate of the switch GCS to turn the switch ON. This current changes capacitor 232 so that its left side is more positive than its right end. When the input positive signal terminates, transistors 228 and 230 turn OFF, and transistors 224 and 226 turn ON. Current passed by transistor 226 is tranmitted through capacitor 232 with negative spike leading edge to gate of switch GCS to turn the switch OFF. The charge in capacitor reverses to its original condition. The above operation is repeated in response to the next positive input signal. From the above description, it is seen that the charge and discharge current of the capacitor in response to signal and signal termination provide the turn-ON and turn-OFF signals to the gate of the switch GCS.

It will be noticed in the following table of values for the circuit of FIG. 15 that resistor 234 is smaller than resistor 236 because higher gate current is required for turn-OFF of a gate controlled switch than is required for turn-ON of the switch. By way of example, the component types and values for the circuit of FIG. 15 may be as follows:

Resistor:

| | | |
|---|---|---|
| 234 | ohms | 3.9 |
| 236 | do | 18 |
| 238 | do | 1000 |
| 240 | do | 430 |
| 242 | do | 560 |
| 244 | do | 100 |
| 246 | do | 1000 |
| 248 | do | 27 |

Capacitor:

| | | |
|---|---|---|
| 232 | do | 2 |

Transistors:

| | | |
|---|---|---|
| 230 and 224 | Type | 2N3244 |
| 226 and 228 | Type | 2N2852 |

It should be understood that the invention is not confined to a bridge type cycloconverter, but that the principles thereof as disclosed herein may be applied to other configurations of artificially commutated cycloconverters, for example the polyphase star (halfwave or halfbridge) type of which FIG. 1 herein and the aforesaid U.S. Patent No. 3,170,107 is one example.

It is to be understood that the herein described arrangements are simply illustrative of the principles of the invention, and that other embodiments and applications are within the spirit and scope of the invention.

We claim as our invention:

1. Apparatus for converting polyphase alternating current of one frequency to alternating current of another frequency, said apparatus comprising input means having a plurality of input lines for receiving polyphase alternating power, said plurality of input lines having implicit therein a number of different pairs of lines, output means, a plurality of controlled bilateral static switching units each when turned ON providing a different circuit configuration between said input means and said output means, each of said circuit configurations connecting a pair of said input lines to said output means, control means for operating said switching units in a repetitive switching pattern at a predetermined rate of repetition to apply successive increments of alternating voltage from said input means to said output means to provide an output frequency that is a function of the difference between the input frequency and said repetition rate, each pattern extending in time over a period defined by a plurality of consecutive uniform time frames, said control means providing adjustable control of the magnitude of voltage applied to said output means independent of the magnitude of the voltage on said input lines and independent of the output frequency.

2. The combination of claim 1 wherein said control means comprises first pulse providing means for providing a train of uniformly spaced first pulses, second pulse providing means for providing a train of uniformly spaced second pulses of the same frequency as the first pulses but displaced therefrom by a selected delay angle, means responsive to each pulse of a cyclic group of said first pulse for turning ON a different one of said switching units, means responsive to each of said second pulses immediately succeeding each of the pulses of said group of first pulses for turning OFF that switching unit which was turned ON by the immediately preceding one of said first pulses, third control means for varying the repetition rate of said first and second pulses to vary the repetition rate of said cyclic group, whereby to vary said output frequency, and wherein control of said second control means controls the second pulse providing means to vary said delay angle, whereby the output voltage is varied.

3. The combination of claim 1 wherein said first means includes first pulse providing means for providing a train of uniformly spaced first pulses, said second means includes second pulse providing means for providing a train of uniformly spaced second pulses of the same frequency as the first pulses but displaced therefrom by a selected delay angle, means responsive to each pulse of a cyclic group of said first pulse for turning ON a different one of said switching units, means responsive to each of said second pulses immediately succeeding each of the pulses of said group of first pulses for turning OFF that switching unit which was turned ON by the immediately preceding one of said first pulses, said control means includes means for varying the repetition rate of said first and second pulses to vary the repetition rate of said cyclic group, whereby to vary said output frequency, and wherein control of said second means controls the second pulse providing means to vary said delay angle, whereby the output voltage is varied independent of input voltage.

4. The combination of claim 1 wherein said control means includes a second control means for dividing each time frame into at least two discrete control periods, the ratio of said periods determining the magnitude of the voltage applied to said output means, and means for varying the lengths of said control periods within and relative to the boundaries of the frames in which they occur.

5. The combination of claim 4 wherein a different one of said switching units is operated in each frame during one of said discrete control periods to apply voltage increments from said input means to said output means and means for shorting said output means during a second control period.

6. The combination of claim 4 wherein said control means provides a switching pattern wherein opposite polarity voltages from said input means are applied to said output means during each frame time, each of said opposite polarity voltages corresponding in time to one of said discrete control periods, the length of said control periods establishing the ratio of positive to negative voltage durations to control the average voltage applied to said output means.

7. In frequency conversion apparatus wherein a plurality of controlled bilateral static switching units interposed between a polyphase source and an output circuit are operated in a repetitive switching pattern at a certain repetition rate to apply successive increments of alternating voltages from the polyphase source to the output circuit to provide an output frequency that is a function of the difference between the input frequency and said repetition rate, control means, said control means having first means for turning each switch ON at a selected time, said control means having second means, independent of momentary magnitudes of the input alternating voltages to which said switches may be subjected, for turning each switch OFF at a chosen time, said second means being controllable to vary said chosen time, whereby the conduction duty cycle of each switch is varied to control the magnitude of the output voltage applied to said output circuit independent of output frequency and the magnitude of the input voltage.

8. The combination as in claim 7 wherein there is means for shorting said output circuit between applications of successive increments of alternating voltage from the source to the output circuit.

9. The combination of claim 7 wherein said switching pattern extends across a plurality of successive time frames of uniform length, and in each frame an increment of alternating voltage from the polyphase source is applied to the output circuit during a part of the frame, and wherein there is means for shorting the output circuit during another part of the frame, the ratio of said parts of said frame determining the magnitude of the voltage applied to said output circuit.

10. The combination of claim 7 wherein the application of the successive increments of alternating voltages is in successive pairs of successive increments of oppositely related voltages, the duration of said increments of oppositely related voltages determining the average voltage applied to said output circuit.

11. The combination of claim 7 wherein said switching pattern extends over a plurality of successive uniform time frames, and in each frame there are applied, from the AC source to the output circuit, successive increments of oppositely related AC voltages.

12. The combination of claim 7 wherein said switching pattern has an extent in time defined by said plurality of consecutive uniform time frames, and in which pattern a different one of said switching units is turned ON at the leading end of each frame of the pattern, and wherein adjustment of said second means varies the length of the conduction duty cycle of each switching unit within and relative to the length of a frame.

13. The combination of claim 12 wherein there is means for shorting the output circuit during at least a portion of that part of each frame that is unoccupied by the conduction duty cycle of the switching unit operating in the frame.

14. The combination of claim 12 wherein there is means for turning ON a second switching unit during each frame to apply from said source to said output circuit during each frame a second voltage oppositely related to and in non-overlapping time relation to the first voltage applied during said frame.

15. The combination of claim 7 wherein said switching pattern has an extent in time defined by a plurality of consecutive uniform time frames equal in number to the number of said voltages, and in which pattern application to the output circuit of a different one of said alternating voltages is initiated at the leading end of each frame of the pattern, and wherein adjustment of said second means varies the length of the dwell time of each said voltage application within and relative to the length of a frame.

16. The combination of claim 14 wherein there is means for shorting the output circuit during at least a portion of that part of each frame that is unoccupied by the voltage application occurring in the frame.

17. The combination of claim 14 wherein there is means for applying from said source to said output circuit during each frame a second voltage oppositely related to and in non-overlapping time relation to the first voltage applied during said frame.

References Cited

UNITED STATES PATENTS

| | | | |
|---|---|---|---|
| 2,899,566 | 8/1959 | Ware et al. | 321—61 X |
| 3,148,323 | 9/1964 | Blake et al. | 321—61 |
| 3,170,107 | 2/1965 | Jessee | 321—7 |
| 3,256,244 | 6/1966 | Byloff et al. | 321—61 |
| 3,274,482 | 9/1966 | Depenbrock | 321—69 |
| 3,332,002 | 7/1967 | Jollois | 321—61 |
| 3,387,195 | 6/1968 | Piccand et al | 318—227 |
| 3,302,093 | 1/1967 | Yarrow | 321—7 |

LEE T. HIX, Primary Examiner

G. GOLDBERG, Assistant Examiner

U.S. Cl. X.R.

307—242, 249, 265; 318—227; 321—61, 69; 323—22